Feb. 6, 1923.

C. BARTELS.
BOLT AND MOUNTING THEREFOR.
FILED FEB. 15, 1921.

1,444,446.

Inventor
Carl Bartels
By his Attorney

Patented Feb. 6, 1923.

1,444,446

UNITED STATES PATENT OFFICE.

CARL BARTELS, OF HAMILTON, OHIO, ASSIGNOR TO THE MOSLER SAFE COMPANY, OF HAMILTON, OHIO, A CORPORATION OF NEW YORK.

BOLT AND MOUNTING THEREFOR.

Application filed February 15, 1921. Serial No. 445,142.

*To all whom it may concern:*

Be it known that I, CARL BARTELS, a citizen of the United States, residing at Hamilton, in the county of Butler and State of Ohio, have invented certain new and useful Improvements in Bolts and Mountings Therefor, of which the following is a specification.

My invention relates to bolts and mountings therefor and is particularly applicable to locking bolts for safes or the like and to their mountings on the bolt bars.

The particular object of my invention is to provide means to render the bolts easy to operate and to reduce the frictional resistance between the bolts and the bolt bars.

It is essential that the actuation of the locking mechanism of safes and the like may be accomplished without a great amount of power being used, and, for this reason, large or heavy locking bolts are usually mounted in separate bearings of either the roller or ball type. These bearings, however, are very costly to make and install. With comparatively heavy or large bolts the usual force necessary to overcome the inertia of the bolts is considerable and when a large number of bolts are used the number and intricacy of the bolts operating parts is increased and consequently more force is required to operate the bolts. As the bolt-work is sometimes entirely controlled automatically by appropriate time-locking machinery upon the interior of the safe with no exterior connection, a very easy running of the parts is required in order that the interior force which the time-lock releases, such as a spring or weight, and necessarily limited in power, may be enabled without fail to actuate the entire series of bolts. The bolt work is often thrown by means of an outside handle; therefore the same would apply when the bolts are operated in this manner. On account of the increased force of modern explosives, all the parts of safe work have been correspondingly increased in size and large and heavy bolts are now more frequently used than formerly.

One of the objects of my invention is to provide means to reduce the frictional engagement between a bolt and its bolt bar to permit the easy running and actuation of the bolt.

Another object of my invention is to provide a bolt adapted to be easily and inexpensively mounted on its bolt bar and adapted to be actuated with the desired ease.

A further object of my invention is to provide a simple and inexpensive bearing for bolts and one which provides an efficient anti-frictional engagement between the bolt and its bolt bar.

Other objects will be in part obvious and in part pointed out hereinafter.

Figure 1:
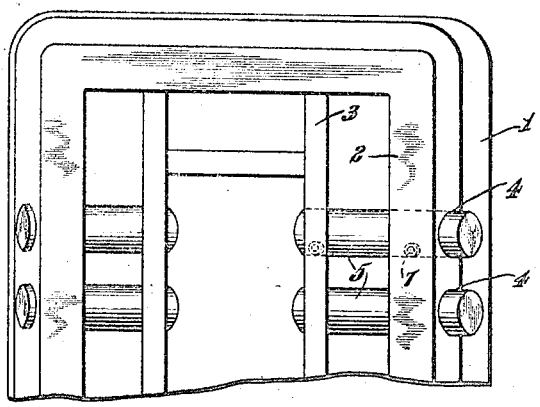
Figure 2:
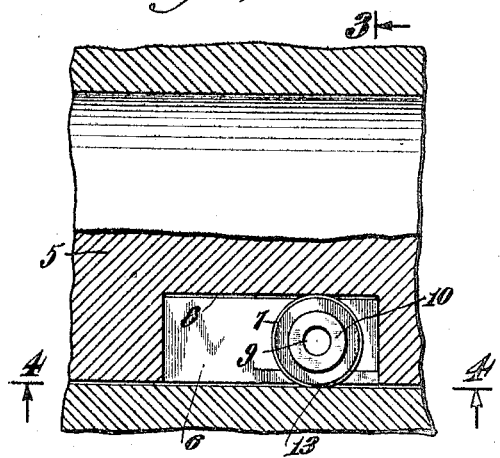
Figure 3:
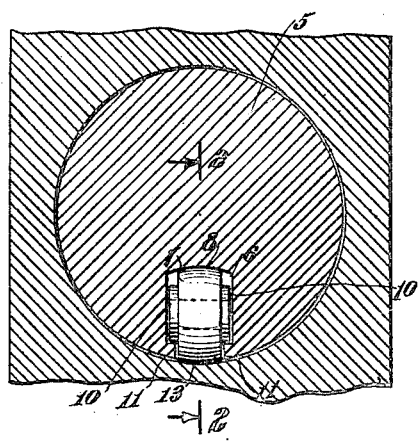
Figure 4:
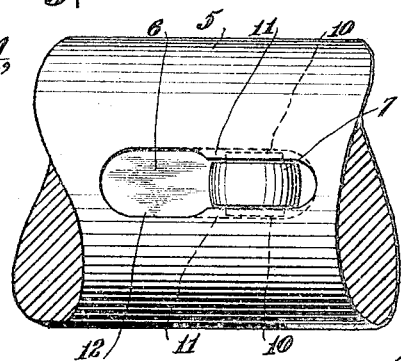

In the accompanying drawings wherein is shown one of the various possible embodiments of this invention Fig. 1 is a rear elevation of a fragment of a safe door showing the locking bolts mounted in the bolt bars, Fig. 2 is a view of a fragment of the bolt and bolt bar in vertical section through the bearing on line 2—2 of Fig. 3, Fig. 3 is a view of a bolt and fragment of a bolt bar in horizontal section on the line 3—3 of Fig. 2, Fig. 4 is a fragmentary view of a bolt showing the bearing in place therein. Similar reference characters indicate similar parts throughout the several views.

Referring to the drawings, 1 indicates the door of the safe carrying the usual bolt bars 2 and 3 having perforations 4 adapted to receive bolts 5 for reciprocation therein. Each bolt 5 is provided on its lower side with a recess or groove 6 adapted to receive and harbor a roller bearing 7 in such position that its top surface is in rolling engagement with the inner wall 8 of recess 6 and its lower surface is in rolling engagement with the surface of aperture 4 as at 13. The lower surface of the roller 7 should extend slightly beyond the periphery of the bolt so as to provide a suitable roller bearing engagement between the bolt and its bolt bar. The groove 6 is sufficiently long to permit the free rolling of the bearing as the bolt is operated to and fro, but the groove should not be so long that it will become sufficiently unmasked during the normal operation of the bolt to permit the roller to drop out of the groove. The roller 7 may be transversely perforated as at 9 and may be supplied with an annular ring 10 on each side to aid in keeping the roller in proper vertical position and in preventing undesirable frictional contact between the sides of the roller and the sides of the groove. Flanges 11 may be left or formed on the bolt and are adapted to come underneath the rings 10 of the roller to prevent the withdrawal of the roller from that portion of the groove.

A sufficient space, however, should be provided as at 12 to permit of the insertion of the roller into the groove or its removal therefrom. The periphery of the roller may be crowned as at 13 to conform to the shape of the surface of the aperture 4 and the shape of the inner surface 8 of the groove may be shaped to conform to the surface of the roller; all of which tends to the better establishment of the desired roller bearing contacts between the bolt and the bolt bar and tends toward the accurate and true running of the bolt.

My improved bolt may be formed by milling or otherwise forming the proper groove 6 in the bolt desired to be used. A suitable roller may then be dropped into the groove and the bolt slipped into position on its bolt bar with the roller carrying the weight of the bolt. Connection may then be made between the lock actuating mechanism (not shown in the drawings) and the bolt. The bolt thus mounted is adapted to be moved back and forth on its bolt bar with the desired ease and accuracy and the roller bearing is so housed that it will not become displaced. The aperture in the bolt bar may be made slightly larger than the bolts to avoid unnecessary friction between the bolts and the sides of the apertures. When a bolt is mounted in two bolt bars, a bearing may be supplied adjacent each bolt bar. The device and construction above described may be employed wherever desired and is not limited to safe bolts.

From the foregoing it is seen that by means of my invention comparatively heavy and large bolts may be mounted at a slight cost to be operated with the utmost ease and freedom and that an efficient anti-friction mounting of the bolts is obtained.

What I claim is:

1. In a device of the character described, the combination with a bolt and a bolt bar therefor, of a recess in said bolt and a roller in said recess in rolling engagement with both said bolt and said bolt bar, a lateral extension on said roller and a flange on said bolt below said extension whereby said roller is held in said recess.

2. In a device of the character described, the combination with a cylindrical bolt and a bolt bar having a circular aperture for said bolt, of a recess in said bolt and a roller disposed in said recess and in said aperture and in rolling engagement with the inner surface of said recess and the surface of said aperture and crowned to the same diameter as that of said aperture.

This specification signed and witnessed this 10th day of February, 1921.

CARL BARTELS.

Witnesses:
J. E. DONALDSON,
ANNA BLUMENTHAL.